(12) United States Patent
Horowitz

(10) Patent No.: US 6,523,030 B1
(45) Date of Patent: *Feb. 18, 2003

(54) SORT SYSTEM FOR MERGING DATABASE ENTRIES

(75) Inventor: Michael L. Horowitz, Pittsburgh, PA (US)

(73) Assignee: Claritech Corporation, Pittsburgh, PA (US)

( * ) Notice: Subject to any disclaimer, the term of this patent is extended or adjusted under 35 U.S.C. 154(b) by 55 days.

This patent is subject to a terminal disclaimer.

(21) Appl. No.: 09/695,113

(22) Filed: Oct. 24, 2000

Related U.S. Application Data

(62) Division of application No. 09/350,757, filed on Jul. 9, 1999, now Pat. No. 6,138,114, which is a division of application No. 08/900,637, filed on Jul. 25, 1997, now Pat. No. 5,995,962.

(51) Int. Cl.[7] .............................................. G06F 17/30
(52) U.S. Cl. ........................ 707/5; 707/1; 707/3; 707/7
(58) Field of Search ............................ 707/5, 2, 7, 102, 707/532, 1, 100, 101, 103, 104, 3, 200–206; 705/7, 1

(56) References Cited

U.S. PATENT DOCUMENTS

| | | | | |
|---|---|---|---|---|
| 5,185,888 A | * | 2/1993 | Tanaka et al. ................. | 707/7 |
| 5,317,507 A | * | 5/1994 | Gallant ....................... | 707/532 |
| 5,442,778 A | * | 8/1995 | Pederson et al. ............... | 707/5 |
| 5,497,486 A | * | 3/1996 | Stolfo et al. .................... | 707/7 |
| 5,535,325 A | * | 7/1996 | Cattell et al. ................ | 707/102 |
| 5,544,352 A | * | 8/1996 | Egger ............................ | 707/5 |
| 5,577,241 A | * | 11/1996 | Spencer ........................ | 707/5 |
| 5,600,829 A | * | 2/1997 | Tsatalos et al. ................ | 707/2 |
| 5,600,831 A | * | 2/1997 | Levy et al. .................... | 707/2 |
| 5,611,076 A | * | 3/1997 | Durflinger et al. .......... | 707/102 |
| 5,619,709 A | * | 4/1997 | Caid et al. .................. | 707/532 |
| 5,995,962 A | * | 11/1999 | Horowitz ....................... | 707/5 |
| 6,138,114 A | * | 10/2000 | Horowitz ....................... | 707/5 |

* cited by examiner

Primary Examiner—Jean M. Corrielus
(74) Attorney, Agent, or Firm—Blaney Harper; Jones, Day, Reavis & Pogue

(57) ABSTRACT

The present invention is a method for operating a computer system to minimize the number of disk storage access operations used in creating an inverted database. This method divides a database into several smaller subdatabases. The documents of the subdatabases are decomposed into subdocuments. A postings list for each subdatabase is then created in which all the terms for the subdatabase are associated with the identity of each subdocument of the subdatabase in which the terms occur. The resulting postings lists for the subdatabases are then merged. The merge process sorts the postings of the subdatabases and merges common terms. The non-common terms are merged after the common terms. The process of sorting the postings list and then merging the common terms followed by the non-common terms minimizes the number of disk storage access operations required for creating the inverted database from a series of inverted subdatabases.

8 Claims, 4 Drawing Sheets

SORT SYSTEM FOR MERGING DATABASE ENTRIES

This application is a divisional of patent application Ser. No. 09/350,757, filed Jul. 9, 1999, now U.S. Pat. No. 6,138,114, which is a divisional of patent application Ser. No. 08/900,637, filed Jul. 25, 1997, now U.S. Pat. No. 5,995,962.

FIELD OF THE INVENTION

This invention relates to the field of database systems. More particularly, this invention relates to a system for the efficient merger of files to create a database.

BACKGROUND OF THE INVENTION

The volume of documents in databases is rapidly expanding. It has been estimated that in excess of 90% of all desired intelligence information is available in documents residing in accessible databases. In order for the information in databases to be useful, a user must be able to locate specific documents relating to specific queries. Existing information retrieval systems make use of inefficient techniques for returning relevant documents. Generally, the existing techniques miss highly relevant documents associated with the users' query. For example, many systems use Boolean logic based query execution techniques wherein key words are connected together via logical or proximity operators. Such a Boolean system merely returns a list of documents, each of which include one of the key word combinations.

The result of a Boolean search is not a quantifiable measure of how similar the returned documents are to the query. Quantifiable measures of similarity are very useful in retrieving documents from databases because documents can be ranked according to the quantifiable measure. In response to the shortcomings of Boolean type searches, vector space type search systems have been developed. In a vector space type search system, a score related to a particular query is computed for each document in the database. In general, a query "Q" and a document "D" can be compared by computing the shared and disjoint features of the query and the document over an orthogonal space of T terms. In such a comparison, for example, a similarity score can be computed by the following formula:

$$S(Q_i, D_j) = \frac{Q_i \cdot D_j}{|Q| \cdot |D|} = \frac{\sum_{k=1}^{i}(q_{i_k} \cdot d_{i_k})}{\sqrt{\sum_{k=1}^{i} q_{i_k}^2} \cdot \sqrt{\sum_{k=1}^{i} d_{i_k}^2}}$$

where $Q_i$ refers to the terms in the query and $D_j$ refers to the terms in the document.

A quantifiable similarity score for a document and query such as computed above is useful because the scores over various documents for a single query can be compared against each other. However, as is clear from an examination of the scoring formula, this scoring formula is significantly affected by variations in the number of terms per document. Since documents in a database typically have a wide range of sizes (e.g., from less than one page to more than hundreds of pages), the scoring must be normalized by size. One way to normalize the scoring is to divide individual documents into subdocuments having approximately the same size. The scoring is then computed on the basis of the subdocument. In this way, mere differences in the number of terms do not significantly skew the similarity analysis.

There are a variety of ways to create subdocuments from documents. A simple way is to create subdocuments that have precisely the same number of terms. Another way is to create subdocuments that have the same number of sentences. Each of these techniques helps to solve the problem of differing size documents. However, each of these techniques ignores the content of the text of the document in creating the subdocument. A technique for creating subdocuments that both forms comparable size subdocuments and takes account of the content of the subdocuments is to make the subdocuments correspond to the paragraphs in the document.

One result of calculating similarity scores for subdocuments of large databases is that the computer must process a very large number of subdocuments. In particular, prior to any scoring or search query processing, the large database to be searched is inverted. Inverting a database involves creating a list of all the terms in the database and the identity of the subdocuments in which those terms appear. Creating this inverted database is difficult because the memory space occupied by the database in disk storage is much larger than the memory space of the main memory in the computer. The computer cannot, therefore, operate directly on the database in main memory because the entire database cannot be written to main memory. As a result, the computer must repeatedly access the database in disk storage to invert it. Since the time required to access data in disk storage is much longer than the time required to access data in the main memory, a significant factor in creating the inverted database is minimizing how often the computer must access disk storage.

A technique for minimizing how often disk storage is accessed during the creation the inverted database is to assemble the large inverted database from several smaller subdatabases. This is a desirable technique because the computer is more efficient in creating smaller subdatabases. However, there still must be some way to merge the smaller subdatabases back together to create the large inverted database. Merging the inverted subdatabases together is a problem because the subdatabases are randomly organized with respect to each other. Attempting to directly merge these subdatabases would require a large number of operations to access the disk storage. This is because for each term in a first inverted subdatabase, the corresponding term in a second inverted subdatabase would have to be located in disk storage and it might be randomly placed in disk storage. Performing the large number of disk storage access operations required in a direct merge process significantly slows down the process of merging the subdatabases. In order to merge the subdatabases in a more efficient way, a sorting technique is required to organize the randomly ordered inverted subdatabases. The sort technique must be structured to that the subdatabases can be merged without requiring a large number of disk storage access operations.

OBJECTS OF THE INVENTION

It is an object of the present invention to analyze documents in a database.

It is a further object of the present invention to efficiently create an inverted database for scoring subdocuments.

It is still a further object of the present invention to efficiently create an inverted database by assembling the inverted database from a series of smaller subdatabases.

It is still a further object of the present invention to efficiently create an inverted database by merging a series of subdatabases into an inverted database.

It is still a further object of the present invention to efficiently create an inverted database by minimizing the number of disk storage access operations during the merging of a series of subdatabases into an inverted database.

It is still a further object of the present invention to efficiently create an inverted database by efficiently sorting subdocuments of subdatabases to minimize the number of disk storage access operations during the merging of a series of subdatabases into an inverted database.

BRIEF OF THE INVENTION

The present invention is a method for operating a computer system to minimize the number of disk storage access operations used in creating an inverted database. This method divides a database into several smaller subdatabases. The documents of the subdatabases are decomposed into subdocuments. A postings list for each subdatabase is then created in which all the terms for the subdatabase are associated with the identity of each subdocument of the subdatabase in which the terms occur. The resulting postings lists for the subdatabases are then merged. The merge process sorts the postings of the subdatabases and merges common terms. The non-common terms are merged after the common terms. The process of sorting the postings list and then merging the common terms followed by the non-common terms minimizes the number of disk storage access operations required for creating the inverted database from a series of inverted subdatabases.

DETAILED DESCRIPTION OF THE INVENTION

Figure 1:
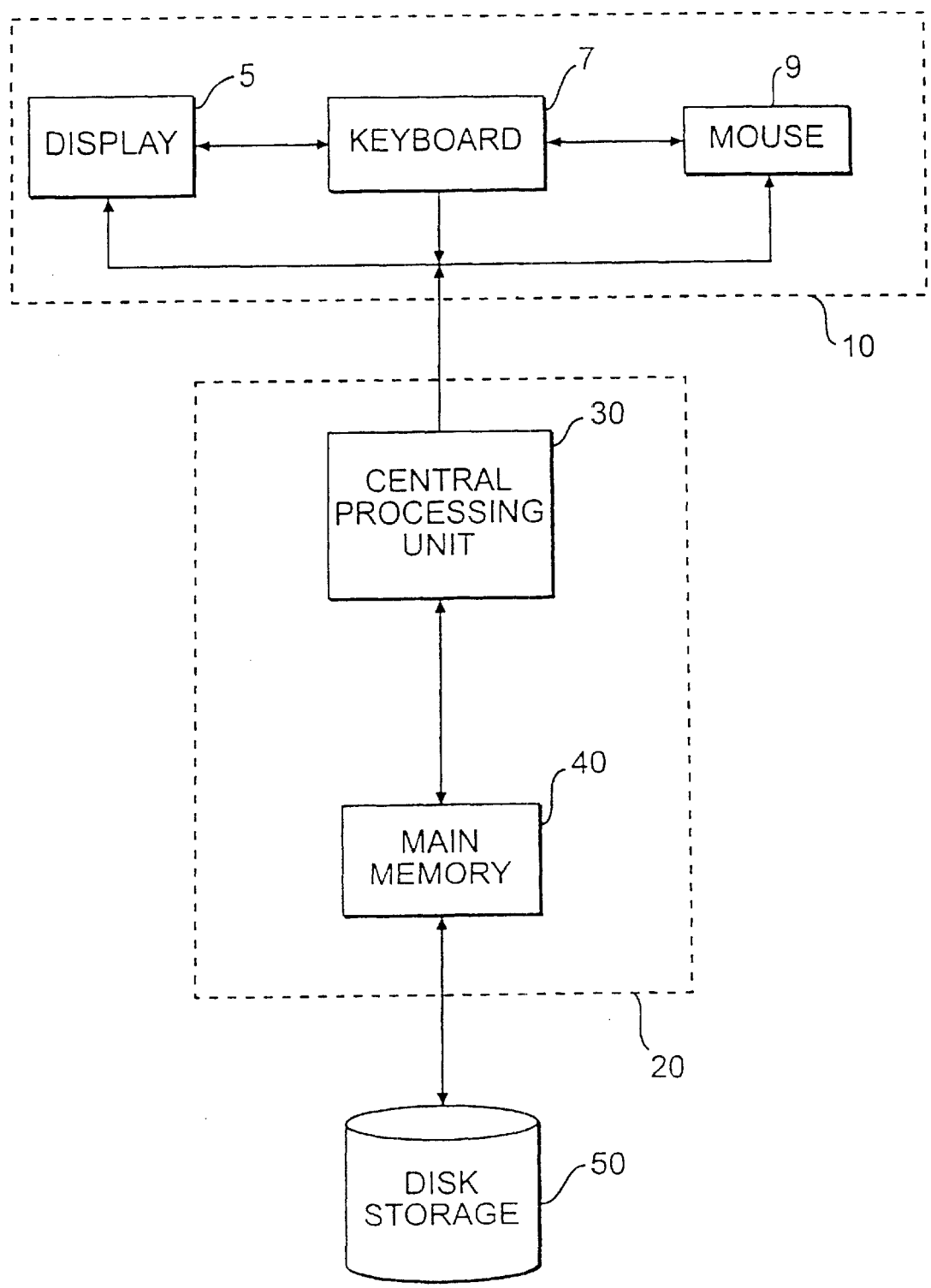
FIG. 1 is an illustration of a computer system used for retrieving records from a database according to the present invention.

FIG. 1 is a block diagram of a computer system used for retrieving information from a database. Computer 20 comprises a central processing unit (CPU) 30 and main memory 40. Computer 20 is connected to an Input/Output system 10 and disk storage 50. The I/O system 10 includes a display 5, a keyboard 7 and a mouse 9. In general, the computer 20 interacts with the I/O system 10 and the disk storage 50. The disk storage 50 stores programs for operating the computer system and it stores the database. The database comprises a series of documents or records. The disk storage unit 50 has a capacity that is much larger than the capacity of the main memory 40. Also, the computer requires much more time to retrieve information from the disk storage than it does to retrieve information from the main memory 40.

The computer 20 executes various programs that are retrieved from disk storage. These programs operate on the database stored in disk storage unit 50 in two ways. First, the programs contain a series of instructions that, among other things, cause the computer 20 to invert a database that is stored in the disk storage unit 50. The inversion process occurs before any query of the database is made and is intended to organize the database such that it can be searched efficiently for particular information. Second, the programs cause the computer 20 to search the database and retrieve texts from documents or parts thereof stored in the database. This search procedure typically involves interaction with a database user to create a query that is the basis for the search.

According to the present invention, the computer 20 organizes a database by inverting it. A database consists of a series of sequentially numbered documents or records. In order to invert a database, the series of documents is initially subdivided into a series of subdatabases. This is because the whole database is too large to operate on in the main memory of the computer 20. For example, documents 1–1000 form subdatabase A, documents 1001–2000 form subdatabase B and so on until all the documents in the database have been assigned to an identified subdatabase. Once the database has been divided into subdatabases, the subdatabases are inverted. Each inverted subdatabase is a listing of all the terms of the subdatabase and the corresponding identifiers of the subdocuments in which the terms occur. This listing is referred to as a postings list.

Figure 2:
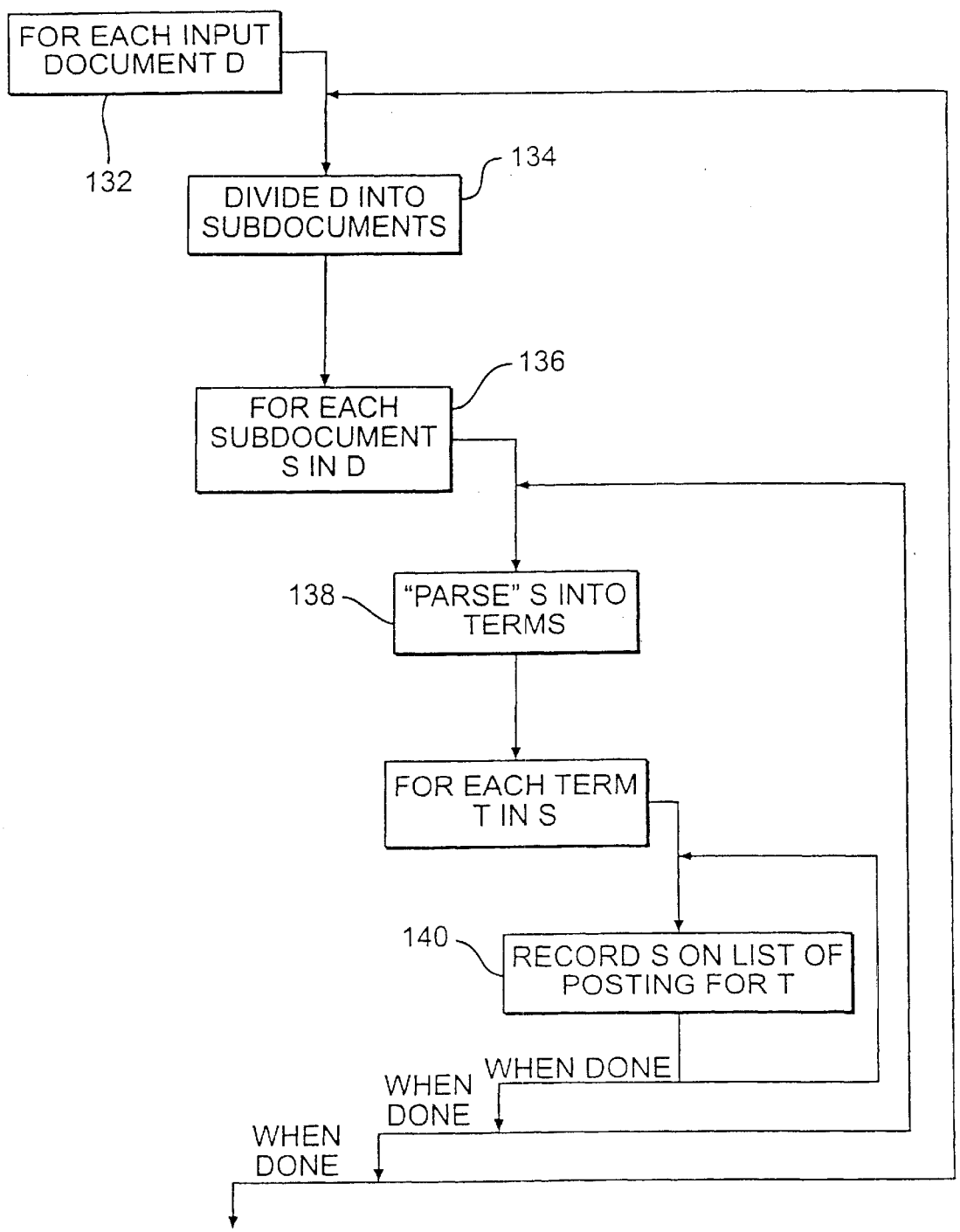
FIG. 2 is a flowchart that illustrates a process for inverting a subdatabase according to an embodiment of the present invention.

FIG. 2 is a flowchart that illustrates a process for inverting a subdatabase. In step 132, a document from the subdatabase is selected. In step 134, the document is divided into subdocuments. In this process, for example, each subdocument generally corresponds to a paragraph of the document. Long paragraphs may consist of multiple subdocuments and several short paragraphs may be included in a single subdocument. The subdocuments all have approximately the same length. Further, the subdocuments are sequentially numbered so as to be identified with documents in the subdatabase. In steps 136 and 138 respectively, a subdocument is then selected and parsed. In this example, the parsing process is accomplished by assigning linguistic structure to sequences of words in a sentence and listing those words or noun phrases of the subdocument that have semantic meaning. The parsing process can be implemented by a variety of techniques known in the art such as the use of lexicons, morphological analyzers or natural language grammar structures.

Once the subdocument has been parsed, step 140 generates a postings list that contains terms (including noun phrases) and the corresponding identifiers of the subdocuments in which the terms occur. Each term in the postings list is given an identifying number that indicates the order that the term appears in the subdatabase. All the subdocuments for each document are then processed according to steps 134–140 and the list of terms and subdocument identifiers is updated. Finally, all the documents of a subdatabase are processed according to steps 132–140. The result of this inversion process on the subdatabases is a term list keyed by position in the subdatabase which identifies all the terms of a subdatabase and the corresponding subdocuments in which the terms occur.

Figure 3:
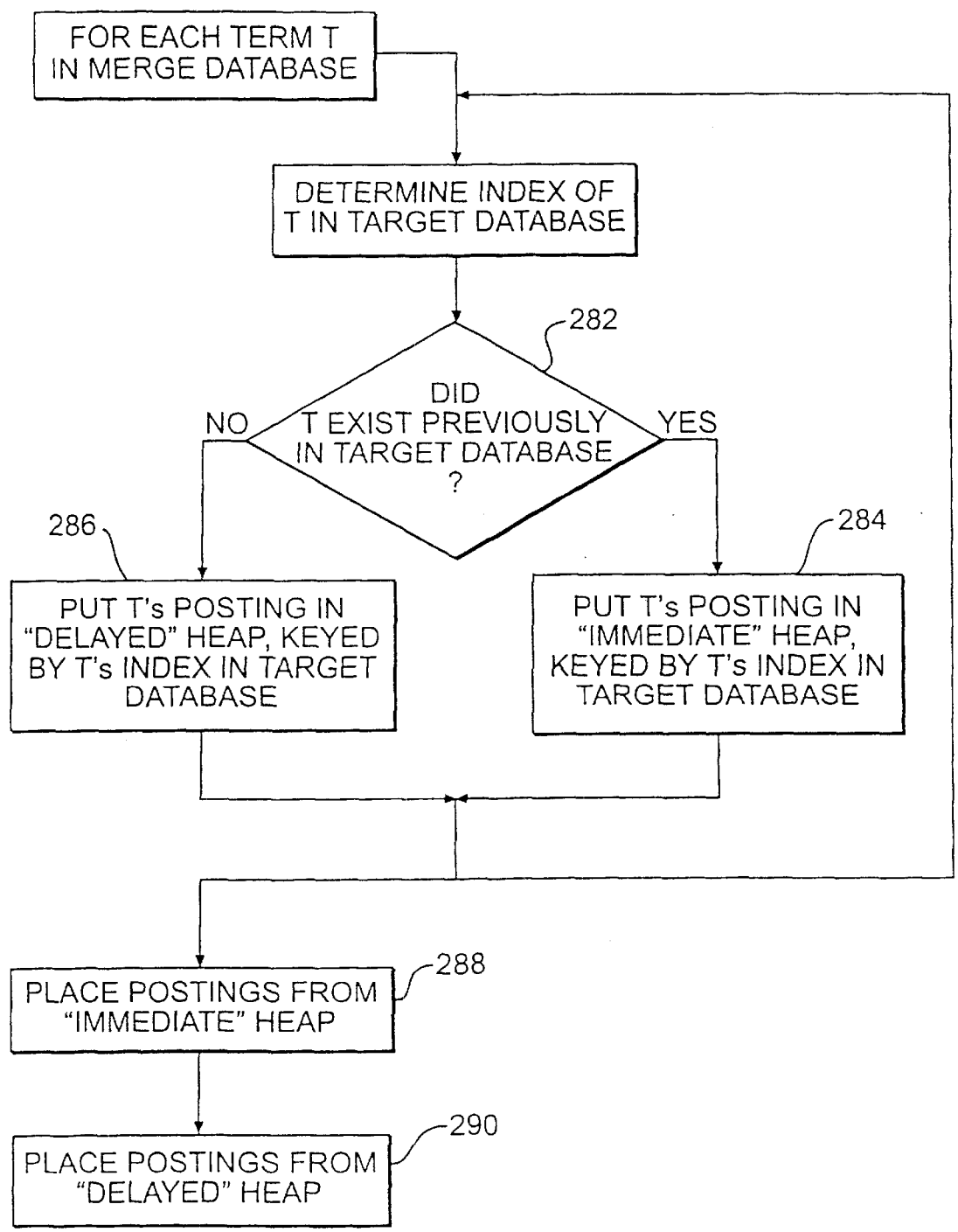
FIG. 3 is a flowchart that illustrates a process for merging subdatabases according to an embodiment of the present invention.

After the subdatabases have been inverted, they have to be merged back together into a single database. That is, the individual postings lists have to be merged such that terms that appear in both subdatabases (for example, A and B) are combined into one entry in a combined term list. This merge process must also account for the terms of one subdatabase (A) that do not appear in the other subdatabase (B) and vice versa. The merge process according to one embodiment of the present invention is illustrated in FIG. 3. Step 282 identifies those terms that are common between the target subdatabase (for example, A) and the merge subdatabase (for example, B) which is to be merged into the target. Step 284 then reassigns or translates the term identifiers (the numerical term identifier that indicates the order of the term in the subdatabase) of the common terms in the merge subdatabase to the term identifier of the target subdatabase. The postings of the common terms are placed in an immediate heap file in disk storage.

Figure 4:
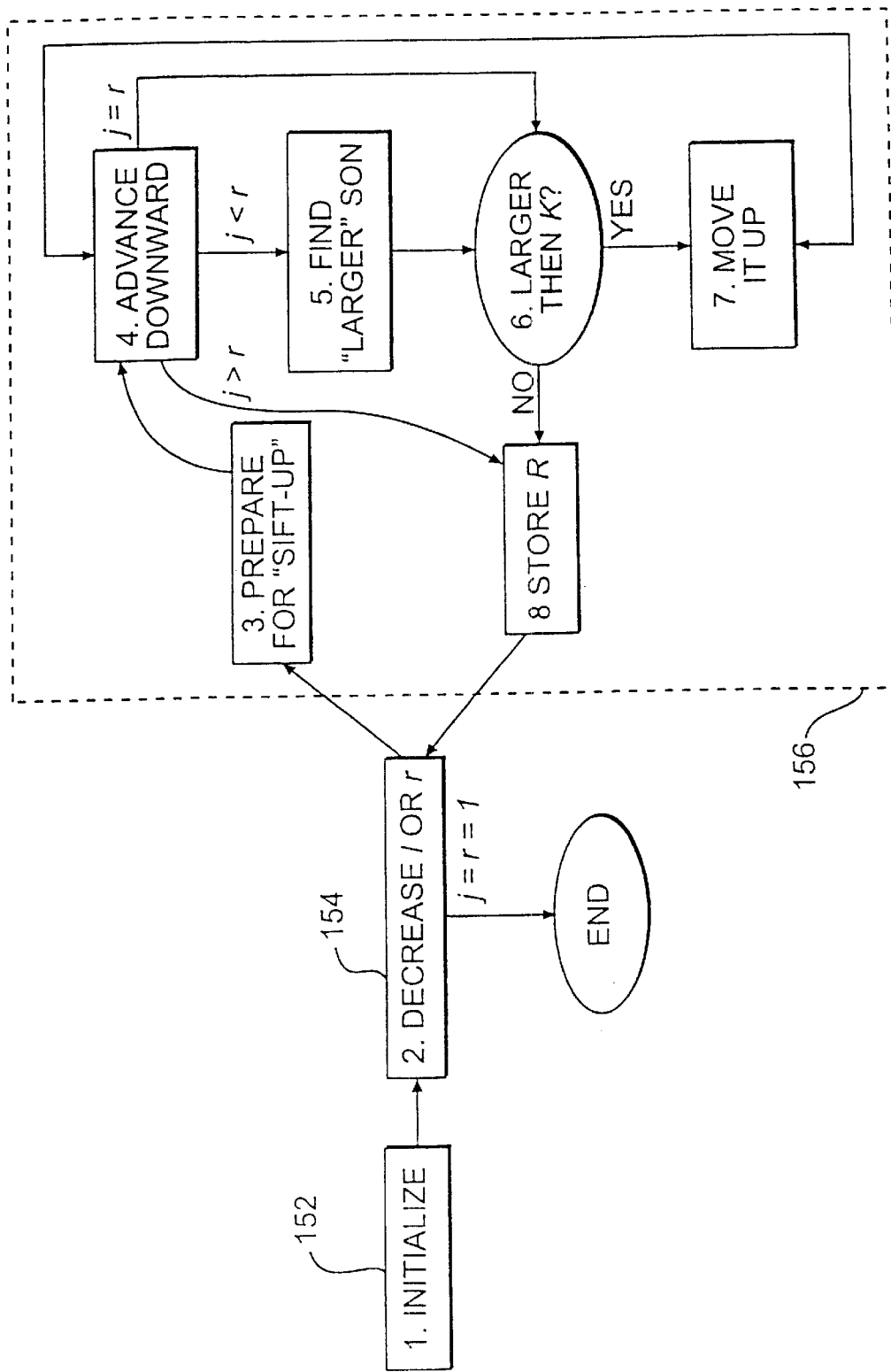
FIG. 4 is a flowchart that illustrates a heap sort process.

Once the common term identifiers have been translated, step 284 then sorts the common terms of the merge subdatabase by their term identifiers. The sort process could be a variety of conventional sort processes. The sort process used in this embodiment is an external heap sort process. An external sort differs from a more typical internal sort because it involves sorting data from the disk storage unit rather than from the internal memory of the computer. The general form of a heap sort process is illustrated in FIG. 4. The process of FIG. 4 is keyed by the term identifier value. It is also initialized by setting l=(N/2)+1 and r=N where N is the number of common terms in the immediate heap. The process of FIG. 4 is operated until r=1. The result of this sort process is that the common terms of the merge-subdatabase (B) are stored in disk storage in the term order of the target subdatabase (A). The practical effect on the computer system of using the external heap sort on the immediate heap (in which the keys are randomly ordered) is that the sort runs can be approximately twice the size of internal memory. This significantly enhances the performance of the sort process by minimizing the number of disk storage access operations needed.

Step 284 of FIG. 3 processes the common terms between the merge and target subdatabases and step 286 processes the non-common terms. In step 286, the non-common terms of the target subdatabase retain their term identifiers. The non-common terms of the merge subdatabase are reassigned term identifiers that proceed sequentially from the highest term identifier of the target subdatabase. The postings for the non-common terms are then placed in a delayed heap. The delayed heap is organized in a sorted order because the term identifiers (key of the heap) of the target non-common terms are in numerical order and the identifiers of the merge non-common terms are assigned sequentially based on the target sequence.

After the terms in the merge subdatabase (B) have been translated and sorted in steps 284 and 286, the common terms of the merge subdatabase (i.e., B) are then merged into the target subdatabase (i.e., A) in step 288. Since the common terms have been translated into an order that approximates their appearance in the target subdatabase A, the number of disk storage access operations is minimized. This is because when data is retrieved from disk storage, it is retrieved in pages or blocks. For example, when the term 'account' having term identifier 815 is encountered in the target subdatabase, (A), disk storage is accessed for term identifier number 815 from the merge subdatabase (B). Disk storage will return to main memory a block of terms identifier numbers (for example, 1–2000) of the merge subdatabase (B). As a result, when the next term identifier of 816 is sought for the merge subdatabase (B), it can be read directly from main memory. Disk storage does not need to be accessed because that page of data already exists in main memory.

After the common terms have been merged, the group of remaining non-common terms from the merge subdatabase (B) are merged in step 290. The number of disk storage access operations for this step is also minimized because the terms are stored in order (according to the term identifiers). In addition, since the number of subdocuments associated with the non-common terms is generally smaller than the number of subdocuments associated with common terms, merging the smaller entries into the target subdatabase near the end of the merge process is more likely to be able to make use of existing holes in disk storage. As a result, this process is space efficient.

Once the initial two subdatabases (i.e., A and B) have been merged, the next merge subdatabase (for example C) is selected to be merged into the new target subdatabase that now consists of the initial two subdatabases (A and B. The new merge subdatabase (C) has its common terms reordered according to the terms in the newly formed target database. The terms of the new merge subdatabase C are then merged into the new target subdatabase followed by the merge of the non-common terms. This process is then repeated until all the subdatabases have been merged into the target database. The result of this process is a single merged inverted database in disk storage listing all the terms of the database and all the corresponding identifiers of subdocuments in which the terms occur.

Once the inverted database has been created, the computer 20 can then operate on that database to perform document retrieval. The retrieval process can involve many types of conventional techniques such as scoring a query against subdocuments in the database and retrieving and displaying documents based on the subdocument score.

While this invention has been particularly described and illustrated with reference to particular embodiments thereof, it will be understood by those skilled in the art that changes in the above description or illustrations may be made with respect to form or detail without departing from the spirit or scope of the invention.

I claim:

1. A method for merging databases, comprising:

identifying common terms that exist in a first and a second inverted subdatabase;

placing subdocument identifiers of said common terms for said second inverted subdatabase into said first inverted subdatabase;

placing subdocument identifiers of non-common terms for said second inverted subdatabase into said first inverted subdatabase after said placement of said common term subdocument identifiers; and sorting said subdocument identifiers from said second inverted subdatabase in an order corresponding to an order of said subdocument identifiers of said first inverted subdatabase.

2. A method for merging databases, as in claim 1, wherein:

said common terms are sorted in a heap sort process prior to placement in said first inverted subdatabase.

3. A method for merging databases, as in claim 1, wherein:

said merging of said inverted subdatabases comprises selecting terms from a second inverted subdatabase to be merged into a first inverted subdatabase;

identifying a second inverted subdatabase index for each of said selected terms in said second inverted subdatabase;

translating said second inverted subdatabase index into a first inverted subdatabase index when said term in said second subdatabase exists in said first subdatabase;

sorting said second inverted subdatabase by said index; and placing entries from said second inverted subdatabase into said first inverted subdatabase by said index.

4. A method for merging databases, as in claim 3, wherein:

a heap sort process sorts said second inverted subdatabase.

5. A system for retrieving documents from a database, comprising:
- a computer coupled to a disk storage unit, said disk storage unit stores a database;
- said computer divides said database into a plurality of subdatabases stored on said disk storage unit, said subdatabases being formed from a plurality of documents from said database;
- said computer inverts each of said subdatabases by dividing each document of said subdatabase into subdocuments wherein each subdocument has an identifier and relating each term of said subdocument with each subdocument in which said term appears by said subdocument identifier;
- said computer merges said inverted subdatabases by identifying common terms that exist in a first and a second inverted subdatabase;
- said computer merges said inverted database by placing subdocument identifiers of said common terms for said second inverted subdatabase into said first inverted subdatabase;
- said computer merges said inverted database by placing subdocument identifiers of non-common terms for said second inverted subdatabase into said first inverted subdatabase after said placement of said common term subdocument identifiers; and
- said computer sorts said subdocument identifiers from said second inverted subdatabase in an order corresponding to an order of said subdocument identifiers of said first inverted subdatabase.

6. A system for retrieving documents from a database, as in claim 5, wherein:
- said common terms are sorted in a heap sort process prior to placement in said first inverted subdatabase.

7. A system for retrieving documents from a database, as in claim 5, wherein:
- said computer merges said inverted subdatabases by selecting terms from a second inverted subdatabase to be merged into a first inverted subdatabase;
- said computer merges said inverted database by identifying a second inverted subdatabase index for each of said selected terms in said second inverted subdatabase;
- said computer merges said inverted subdatabase by translating said second inverted subdatabase index into a first inverted subdatabase index when said term in said second subdatabase exists in said first subdatabase;
- said computer merges said inverted subdatabase by sorting said second inverted subdatabase by said index; and
- said computer merges said inverted subdatabase by placing entries from said second inverted subdatabase into said first inverted subdatabase by said index.

8. A system for retrieving documents from a database, as in claim 7, wherein:
- a heap sort process sorts said second inverted subdatabase.

* * * * *